United States Patent
Oshima

(10) Patent No.: US 7,710,485 B2
(45) Date of Patent: May 4, 2010

(54) SOLID-STATE IMAGE PICKUP APPARATUS WITH SIGNAL CHARGE TRANSFER ADAPTIVE TO AN IMAGE SHOOTING CONDITION

(75) Inventor: Hiroyuki Oshima, Asaka (JP)

(73) Assignee: FujiFilm Corporation, Tokyo (JP)

( * ) Notice: Subject to any disclaimer, the term of this patent is extended or adjusted under 35 U.S.C. 154(b) by 445 days.

(21) Appl. No.: 11/714,763

(22) Filed: Mar. 7, 2007

(65) Prior Publication Data

US 2007/0216791 A1 Sep. 20, 2007

(30) Foreign Application Priority Data

Mar. 14, 2006 (JP) ............... 2006-069124

(51) Int. Cl.
*H04N 3/14* (2006.01)
*H04N 5/335* (2006.01)
(52) U.S. Cl. .................. 348/323; 348/223.1
(58) Field of Classification Search ............... 348/294, 348/311, 312, 321, 323, 233.1
See application file for complete search history.

(56) References Cited

U.S. PATENT DOCUMENTS

| | | | | |
|---|---|---|---|---|
| 5,693,948 A | * | 12/1997 | Sayed et al. | 348/E3.032 |
| 5,896,172 A | * | 4/1999 | Korthout et al. | 348/312 |
| 6,337,713 B1 | * | 1/2002 | Sato | 348/311 |
| 7,489,356 B2 | * | 2/2009 | Nakahira | 348/311 |
| 7,522,205 B2 | * | 4/2009 | Parks | 348/311 |
| 2003/0146996 A1 | * | 8/2003 | Ide | 348/323 |
| 2004/0189841 A1 | | 9/2004 | Oda et al. | |

FOREIGN PATENT DOCUMENTS

EP    0 615 376 A2    9/1994

\* cited by examiner

*Primary Examiner*—Gevell Selby
(74) *Attorney, Agent, or Firm*—Birch, Stewart, Kolasch & Birch, LLP

(57) ABSTRACT

A solid-state image pickup apparatus may improve, depending on the shooting condition, image degradation such as white balance offset or color mixture. An output scheme determiner defines, depending on shooting conditions such as shooting and sensitivity modes, output schemes such as the number of operative output circuits in an image sensor and a drive frequency of a horizontal transfer path. Depending on an output scheme, the vertical and transfer paths and output circuits in the image sensor are controlled, and one image sensing area is divided and the transfer rate of the horizontal path is reduced accordingly to produce an image signal. The determiner defines, in high sensitivity mode, the output scheme having a higher number of operative circuits and lower drive frequency. The apparatus may improve, without losing the high-speed reading, the horizontal transfer efficiency to avoid the transfer degradation and produce images free from degradation.

19 Claims, 7 Drawing Sheets

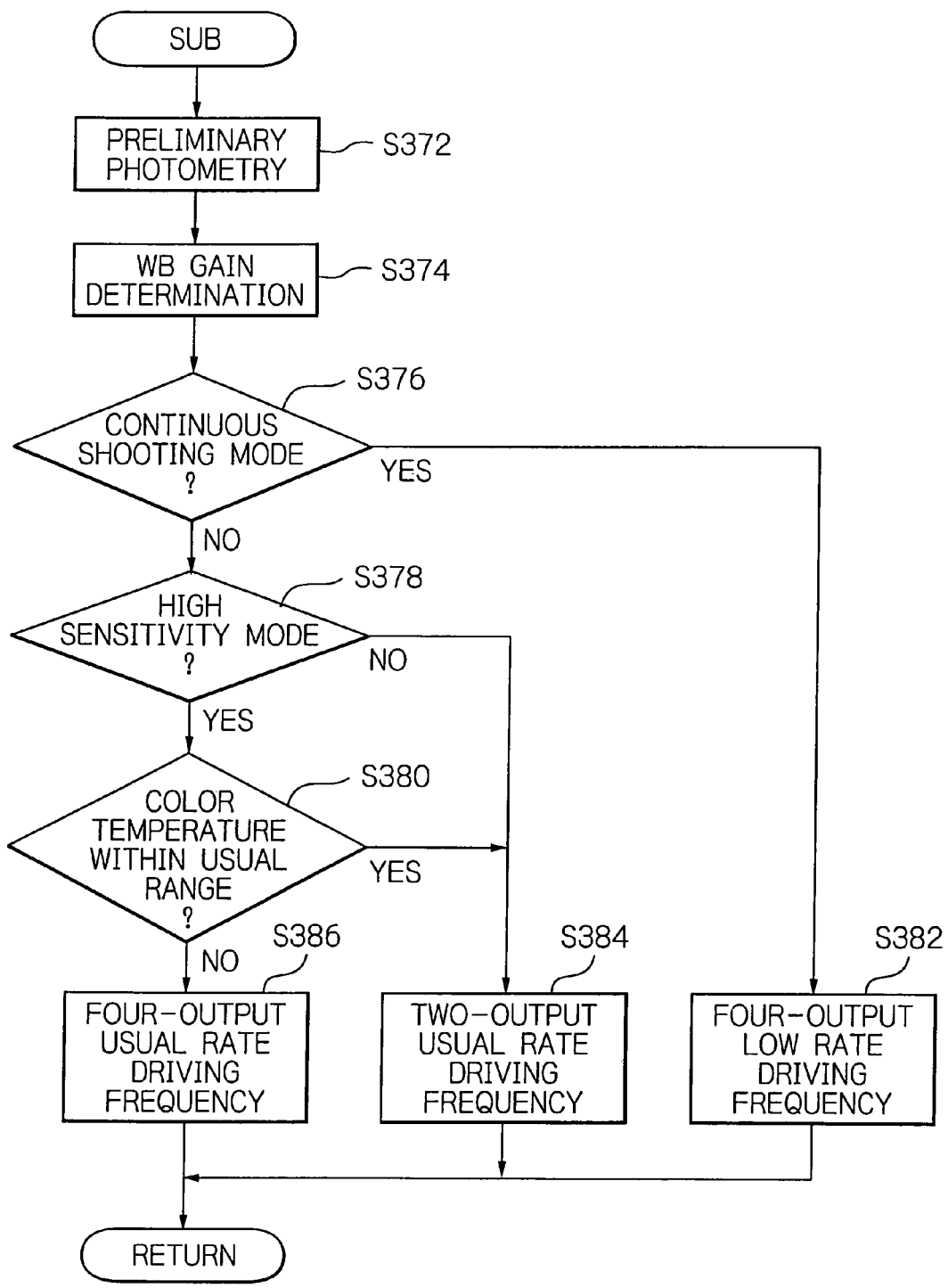

SOLID-STATE IMAGE PICKUP APPARATUS WITH SIGNAL CHARGE TRANSFER ADAPTIVE TO AN IMAGE SHOOTING CONDITION

BACK GROUND OF THE INVENTION

1. Field of the Invention

The present invention relates to a solid-state image pickup apparatus, and more specifically such an apparatus for picking up an optical image of an imaging field under image shooting conditions such as modes of shooting scenes and modes of optical sensitivity.

2. Description of the Background Art

A conventional solid-state image sensor such as the charge coupled device (CCD) uses the photo diode (FD), which generates signal charge and transfers it over vertical transfer paths and a horizontal transfer path to an output circuit in a bucket-brigade fashion. The output circuit converts the transferred signal charge into a corresponding voltage signal to output the latter.

Some of the solid-state image pickup apparatuses having a solid-state image sensor adjust the charge transfer rates of the transfer paths (e.g., increase the rates) by changing, e.g., increasing, the drive signal frequency to control the transfer paths.

European patent application publication No. 0615376 A2 discloses, for example, an image reading apparatus, which includes a first oscillator that generates a clock of first frequency necessary for the normal reading operation, and a second oscillator that generates a clock of second frequency lower than the first frequency. The image reading apparatus disclosed provides, during a read operation period, the oscillation clock of the first oscillator, while, during the read waiting period, the oscillation clock of the second oscillator, via a switching circuit to a CCD drive pulse generator in order to suppress the heat generation of the CCD device and its periphery circuits.

U.S. patent application publication No. 2004/0189841 A1 to Oda et al discloses a solid-state image pickup apparatus, in which a system controller generates a control signal depending on the sensitivity setting and sends the control signal to a timing signal generator. A timing signal of frequency depending on the control signal is generated by an oscillator in the timing signal generator. Depending on the timing, the solid-state image sensor is driven. In response to a high sensitivity imaging selected, the horizontal transfer signal is generated at a frequency lower than the normal frequency to increase the transfer efficiency per stage of the horizontal transfer. The unfavorable color mixture is thus prevented to provide the high-definition image.

However, property improvement relying upon the lower drive frequency as disclosed by Oda et al causes a lower reading speed that may not comply with the high-speed continuous imaging.

SUMMARY OF THE INVENTION

It is an object of the present invention to provide a solid-state image pickup apparatus that may improve, without deteriorating the high-speed reading, the horizontal transfer efficiency to avoid the transfer degradation and prevent a disadvantage such as color mixture.

In accordance with the present invention, there is provided a solid-state image pickup apparatus comprising an image sensor which comprises a plurality of photosensitive portions for photoelectrically converting incident light to signal charge, the photosensitive portions being arranged in a row and a column direction to form an imaging surface corresponding to a plurality of pixels, a plurality of vertical transfer paths for vertically transferring the signal charge obtained in the plurality of pixels on a one-row basis, a horizontal transfer path for horizontally transferring the signal charge transferred from the vertical transfer paths, and an output circuit for converting the signal charge transferred from the horizontal transfer path to an image electrical signal representing an image and outputting the image electrical signal, the apparatus further comprising a signal processor for receiving the image electrical signal from the image sensor and processing the image electrical signal, wherein the horizontal transfer path is provided in single or more, and the output circuit is provided in plural, each of said output circuits being provided at different one end of the horizontal transfer path, the signal processor comprising an output scheme determiner for defining, depending on a shooting condition, an output scheme such as a number of operative ones of the plurality of output circuits and a drive frequency of the horizontal transfer path, the image sensor controlling, depending on the drive frequency, a horizontal transfer rate of the signal charge in the horizontal transfer path, and controlling, depending on the number of operative circuits, the plurality of vertical transfer paths, the horizontal transfer path, and the plurality of output circuits, in such a manner as to operate one or more of the plurality of output circuits corresponding to the number of operative circuits, drive the plurality of vertical transfer paths and the horizontal transfer path to transfer the signal charge only to the operating output circuit, and allow the operating output circuit or circuits to produce and output the image electrical signal of the same number as the number of operative circuits.

According to the solid-state image pickup apparatus of the present invention, the image sensor includes a plurality of vertical transfer paths, one or more horizontal transfer paths, and a plurality of output circuits, and controls the transfer of the signal charge read from each of the pixels that form the imaging surface to output an image electrical signal, the output scheme determiner determines, depending on the shooting conditions such as the shooting and sensitivity modes, an output scheme such as the number of operative output circuits in the image sensor and the drive frequency of the horizontal transfer path, and the image sensor horizontally transfers the signal charge at a transfer rate depending on the drive frequency and depending on the number of operative circuits, and, as necessary, divides the image surface to produce a plurality of image electrical signals. Images suited for the imaging condition may thus be produced.

The solid-state image pickup apparatus of the present invention also determines, in the high sensitivity mode, the output scheme having a higher number of operative circuits and a lower drive frequency than normal, and carries out the shooting depending on the output scheme. The apparatus may thus improve, without losing the high-speed reading, the horizontal transfer efficiency to avoid the transfer degradation, and may produce an image free from degradation such as the color mixture.

In the solid-state image pickup apparatus of the present invention, a color temperature determiner may determine the color temperature of an image signal represented by the three primary colors, red, green and blue, and change the output scheme of the image sensor, depending on the decision result. The apparatus may thus avoid a significant color mixture which would otherwise be caused for a large difference between color component signals, and avoid a color offset between sub-images, or divided areas, forming a frame of image.

In addition, the solid-state image pickup apparatus of the present invention, a plurality of output circuits in the image sensor each outputs an image signal via a corresponding output buffer, which amplifies the current of the image signal in a frequency band depending on its load resistance, and the load resistance controller controls the load resistance depending on the drive frequency for driving the horizontal transfer path in the image sensor. For a decreased drive frequency, i.e., a reduced horizontal transfer rate, the load resistance may therefore be increased to reduce the current consumption by the output buffer.

BRIEF DESCRIPTION OF THE DRAWINGS

The objects and features of the present invention will become more apparent from consideration of the following detailed description taken in conjunction with the accompanying drawings in which:

FIG. 8 is a flowchart useful for understanding an operation procedure of the solid-state image pickup apparatus of the embodiment shown in FIG. 7.

DESCRIPTION OF THE PREFERRED EMBODIMENTS

With reference to the accompanying drawings, illustrative embodiments of the solid-state image pickup apparatus according to the present invention will be described in more detail.

Figure 1:
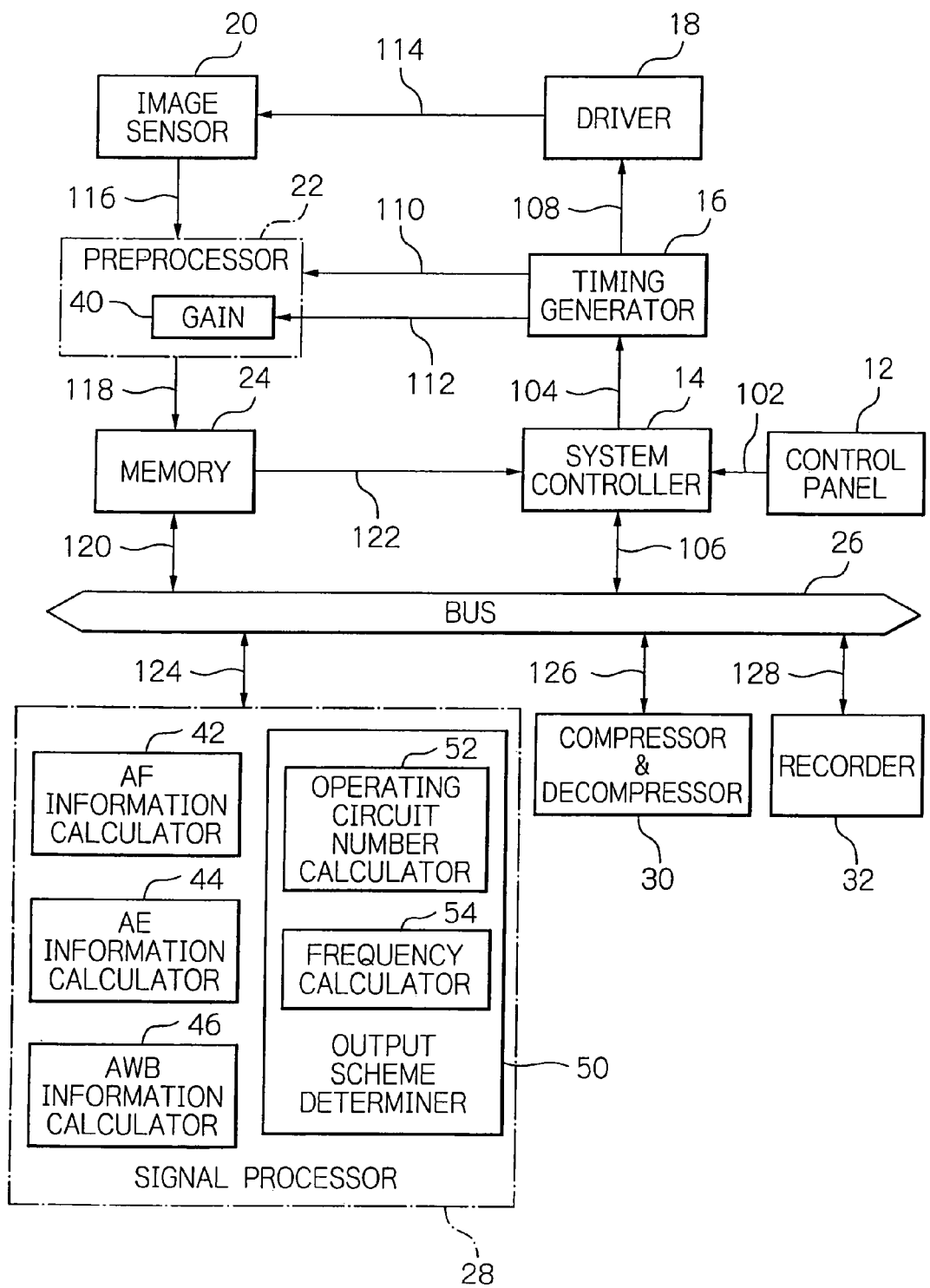
FIG. 1 is a schematic block diagram showing an illustrative embodiment of a solid-state image pickup apparatus of the present invention.

The solid-state image pickup apparatus 10 of the instant embodiment includes, as shown in FIG. 1, a system controller 14, a timing generator 16 and a driver 18 which are operative in response to the manipulation of a control panel 12 to control an image sensor 20 to catch incident light from an imaging field to capture the optical image of the field. In the image pickup apparatus 10, an image signal representative of the captured image in the form of analog signal is converted to a corresponding digital signal by a preprocessor 22. The digital image signal is temporarily stored in a memory 24, from which the digital image signal is read out over a bus 26 to a signal processor 28 and a compressor and decompressor 30, which processes the digital signal so as to record the processed image signal on a recorder 32. Note that portions not directly related to understanding the present invention will neither be illustrated nor described for simplicity and clarity.

The image pickup apparatus 10 includes particularly an output scheme determiner 50 that determines an output scheme for the signal charge developed from the image sensor 20. In the apparatus 10 of the instant embodiment, the signal processor 28 includes the output scheme determiner 50. The apparatus 10 may have different output schemes that are selectable so as to define, for example, the number of circuits which are operative among the output circuits included in the image sensor 20, in other words, the number of sub-areas or divided areas of a frame of image picked up, and drive frequencies for driving the horizontal transfer path in the image sensor 20, in other words, the horizontal transfer rates.

In the present illustrative embodiment, the apparatus 10 is adapted to set one of a plurality of image-shooting modes and shoot images in a shooting mode thus set. The plurality of shooting modes include a still image mode where still images are normally picked up, a continuous-shooting mode where a series of still images are continuously picked up, and a movie mode where an imaging field is captured as moving pictures.

The image pickup apparatus 10 is also adapted to set one of a plurality of sensitivity modes including the International Standards Organization (ISO) sensitivities, and shoot under the sensitivity thus set.

The control panel 12 is a manual operation device that is adapted to receive a direction from an operator. The control panel 12 has a function of being operative in response to the manual operation condition of the operator such as a stroke operation of a shutter release button, not shown, providing an operation signal 102 to the system controller 14. Signals are designated by reference numerals attached to connections on which they appear.

In the instant embodiment, the control panel 12 may have a shutter release button as a push button configured to be depressed in two consecutive steps. The control panel 12 recognizes a state where the shutter release button is not depressed as the standby position, and directs preliminary pickup at the first step, half-stroke position, and the actual pickup at the second step, full-stroke position.

The control panel 12 may be adapted to receive from the operator a shooting mode and a sensitivity mode and then provide the operation signal 102 representing the mode thus specified to the system controller 14 for setting.

The system controller 14 is a general controller adapted to control the operation of the entire pickup apparatus 10 in response to the operation signal 102 provided from the control panel 12, and may be implemented by a central processing unit (CPU). In the instant embodiment, the controller 14 produces a control signal 104 in response to the operation signal 102 and supplies the signal 104 to the timing generator 16 to control the generator 16.

The system controller 14 is connected via a connecting line 106 to a bus 26, which in turn is connected to the memory 24, the signal processor 28, the compressor and decompressor 30, and the recorder 32. The system controller 14 may produce the control signals for controlling the constituent elements in the apparatus 10 and supply them with the signals thus produced. The system controller 14 may also be configured to receive required data from those elements.

When the system controller 14 of the instant embodiment is directed by the operation signal 102 to carry out the preliminary or actual pickup, the controller 14 produces the control signals 104 and 106 to cause those portions in the apparatus 10 to carry out the preliminary or actual pickup.

The controller 14 may, for example, supply the control signal 106 to the signal processor 28 that directs the preliminary pickup and may direct the output scheme determiner 50 to define, or establish, an output scheme. The controller 14 may then acquire the defined output scheme from the determiner 50, and supply the timing generator 16 with the control signal 104 that specifies the output scheme thus defined.

The timing generator 16 may include an oscillator that generates the basic clock, or system clock, for operating the apparatus 10, to supply the basic clock to each portion, although not shown in FIG. 1. The generator 16 may be adapted for being responsive to the control signal 104 from the system controller 14 to generate timing signals 108 and 110. The generator 16 may supply the timing signals 108 and 110 to the driver 18 and preprocessor 22, respectively, to control the respective portions.

In the present embodiment, the timing generator 16 particularly receives the control signal 104 for specifying an output scheme, and generates the timing signals 108 and 110 that specify an appropriate output scheme.

Figure 2:
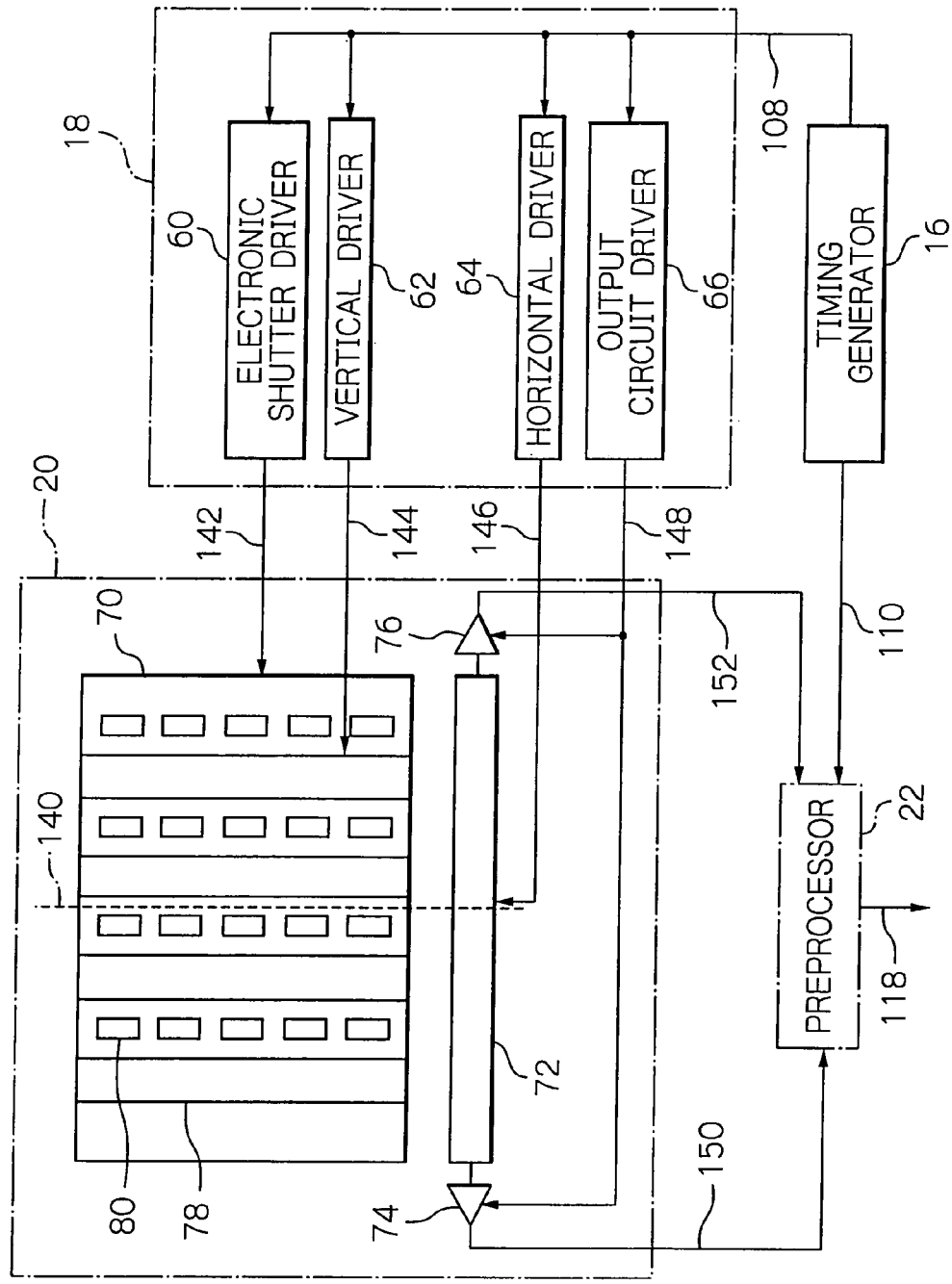
FIG. 2 is a schematic block diagram of an image sensor and a driver in the solid-state image pickup apparatus of the embodiment shown in FIG. 1.

The driver 18 has a function of driving the image sensor 20. The driver 18 of the illustrative embodiment is responsive to the timing signal 108 from the timing generator 16 to generate a drive signal 114 and supplies it to the image sensor 20 to control the latter. The driver 18 includes, as shown in FIG. 2, for example, an electronic shutter driver 60, a vertical driver 62, a horizontal driver 64, and an output circuit driver 66. Those drivers generate the drive signal 114 including an electronic shutter pulse 142, a vertical drive signal 144, a horizontal drive signal 146, and a reset pulse 148.

In the instant illustrative embodiment, the driver 18 particularly receives the timing signal 108 that specifies the output scheme, and generates the drive signal 114 that controls the image sensor 20 to output the signal charge in the output scheme. The driver 18 may use the vertical drive signal 144, horizontal drive signal 146, and reset pulse 148 to control the output scheme of the image sensor 20.

The image sensor 20 includes, as shown in FIG. 2, an imaging surface, or a photosensitive cell array, 70 corresponding to a frame of image to be captured, a horizontal transfer path 72, and a plurality of, e.g., two, output circuits 74 and 76. The image sensor 20 is adapted to convert the optical image of an imaging field formed on the imaging surface 70 to a corresponding electrical signal 116 and supplies the signal 116 to the preprocessor 22. In the instant embodiment, the electrical signal 116 is outputted from the plurality of output circuits 74 and 76 as electrical signals 150 and 152 representing sub-images, respectively. The image sensor 20 may be, for example, of a charge coupled device (CCD).

The imaging surface 70 includes a plurality of photosensitive portions 80 functioning as a corresponding plurality of pixels. The photosensitive portions 80 are arranged in row and column directions of a frame of image to be captured. The photosensitive portions 80 in each column are connected to the same vertical transfer path 78. Each photosensitive portion 80 is adapted to photoelectrically convert incident light to corresponding signal charge. Although the imaging surface 70 of the present embodiment may actually include a large number of vertical transfer paths, FIG. 2 shows a small number of vertical transfer paths 78 only for the purpose of simplicity and clarity. Although each vertical transfer path 78 may actually include a large number of photosensitive portions also, FIG. 2 shows only a small number of photosensitive portions 80 also for simplicity and clarity.

In the instant embodiment, the imaging surface, or photosensitive cell array, 70 discharges unwanted charge in each photosensitive portion 80 to the over flow drain (OFD) in response to the electronic shutter pulse 142, for example. The imaging surface 70 receives incident light during a preselected period of time on each photosensitive portion 80, thus storing electric charge. The imaging surface 70 reads out the signal charge stored in each photosensitive portion 80 to the vertical transfer path 78 in response to a read pulse, not shown, from the driver 18.

The vertical transfer paths 78 transfer, in response to the vertical drive signal 144, the signal charge in the vertical direction to the horizontal transfer path 72, in such a manner that one horizontal line, or row, of signal charge is shifted at a time. The horizontal transfer path 72 in turn transfers each horizontal line of signal charge, with or without being split, in either or both of the horizontal directions to the output circuit 74 or 76 in response to the horizontal drive signal 146.

The output circuits 74 and 76 are provided at the final stages, i.e., the both ends, of the horizontal transfer path 72. The output circuits 74 and 76 have respective floating diffusion amplifiers (FDAs), not shown, which reset themselves in response to the reset pulse 148 and convert the signal charge supplied thereto for each pixel to analog electrical signals 150 and 152 to output the signals to the preprocessor 22.

In the illustrative embodiment, when the image sensor 20 receives the drive signal 114 that specifies the one-output scheme, for example, the horizontal transfer path 72 may horizontally transfer all of the signal charge from the vertical transfer paths 78 in one direction, i.e., to either one of the output circuits 74 and 76. Thus, the output circuit 74 or 76 may ultimately output the electrical signal 116 representative of one frame of image.

When the image sensor 20 receives the drive signal 114 that specifies the two-output scheme, the horizontal transfer path 72 may operate as follows. The horizontal transfer path 72 may horizontally transfer the signal charge from the vertical transfer paths 78 positioned on the left side in FIG. 2 with respect to the center line 140 of the imaging surface 70 (e.g., in the left half) in the left direction, i.e., to the output circuit 74. The horizontal transfer path 72 may also horizontally transfer the signal charge from the vertical transfer paths 78 positioned on the right side in the figure with respect to the center line 140 of the imaging surface 70 (e.g., in the remaining, right half) in the right direction, i.e., to the output circuit 76. The output circuit 74 may thus output electrical signals 150 and 152 representative of the left and right areas of a frame of image captured, respectively.

The preprocessor 22 is controlled by the timing signal 110 supplied from the timing generator 16 to provide the electrical signal 116 with an analog signal processing such as the correlated double sampling or automatic gain control. The preprocessor 22 also analog-to-digital converts the electrical signal 116 into a digital image signal 118 and outputs the resultant signal 118 to the memory 24 for storage.

In the instant embodiment, the preprocessor 22 may obtain, as shown in FIG. 1, a gain value 112 from the timing generator 16, and advantageously use the gain value 112 to amplify the electrical signal 116. The preprocessor 22 may use the gain value 112 in the amplification in the analog-to-digital conversion, for example. Although, in FIG. 1, the preprocessor 22 obtains the gain value 112 from the timing generator 16, the preprocessor 22 may alternatively be adapted to obtain the value 12 from the system controller 14.

The preprocessor 22 may receive, as shown in FIG. 2, the analog electrical signals 150 and 152 from the plurality of output circuits 74 and 76, respectively. The preprocessor 22 may then provide the signals with the analog signal processing depending on the properties of the respective output circuits.

The signal processor 28 is connected via the connecting line 124 to the bus 26, which is in turn connected to the system controller 14, memory 24, compressor and decompressor 30, and recorder 32. The signal processor 28 is adapted to be responsive to the control signal 106 provided from the system controller 14, to retrieve a digital image signal 120 stored in the memory 24 and provide the signal with the digital signal processing. The signal processor 28 may provide the digital image signal 120 with the digital signal processing such as the offset correction, white balance adjustment, gamma correction, or synchronization processing. The signal processor 28 may provide the digital image signal 124, after processed, back to the memory 24 for storage.

The signal processor 28 includes an automatic focus (AF) information calculator 42, an automatic exposure (AE) information calculator 44, and an automatic white balance (AWB) information calculator 46. These calculators operate in the preliminary pickup to calculate the AF information for use in the AF control, AE information for use in the AE control, and WB coefficient for use in the WB correction, respectively.

In the instant embodiment, the signal processor 28 particularly includes an output scheme determiner 50 that defines or establishes an output scheme. The determiner 50 operates, in response to the control signal 106 supplied from the system controller 14, in the preliminary pickup for example to define an output scheme and supplies the thus defined output scheme to the controller 14. The determiner 50 may advantageously be adapted to define an output scheme depending on a given shooting condition of the apparatus 10. The determiner 50 may define an output scheme depending on, for example, the shooting and sensitivity modes.

The output scheme determiner 50 of the instant embodiment may define as an output scheme the number of the output circuits 74 and 76 rendered operative and the drive frequency of the horizontal transfer path 72. The determiner 50 may include an operating-circuit number calculator 52 and a frequency calculator 54, which function as calculating the number of operative circuits and the drive frequency, respectively.

The operating-circuit number calculator 52 and frequency calculator 54 calculate, depending on the shooting conditions such as the shooting and sensitivity modes, the number of operative circuits 130 and drive frequency 132, respectively. For the high sensitivity mode, for example, the calculators 52 and 54 calculate the higher number of operative circuits and lower drive frequency than usual.

The compressor and decompressor 30 is connected via a connecting line 126 to the bus 26. The compressor and decompressor 30 is adapted to compress the image signal handled by the apparatus 10 to record the image signal in the recorder 32 and decompress the image signal recorded in the recorder 32 to allow the image signal to be handled by the apparatus 10.

The recorder 32 is connected via a connecting line 128 to the bus 26. The recorder 32 is adapted to record the image signal compressed by the compressor and decompressor 30 into the record medium via its medium interface, not shown. The record medium may be of a removable type.

Figure 3:
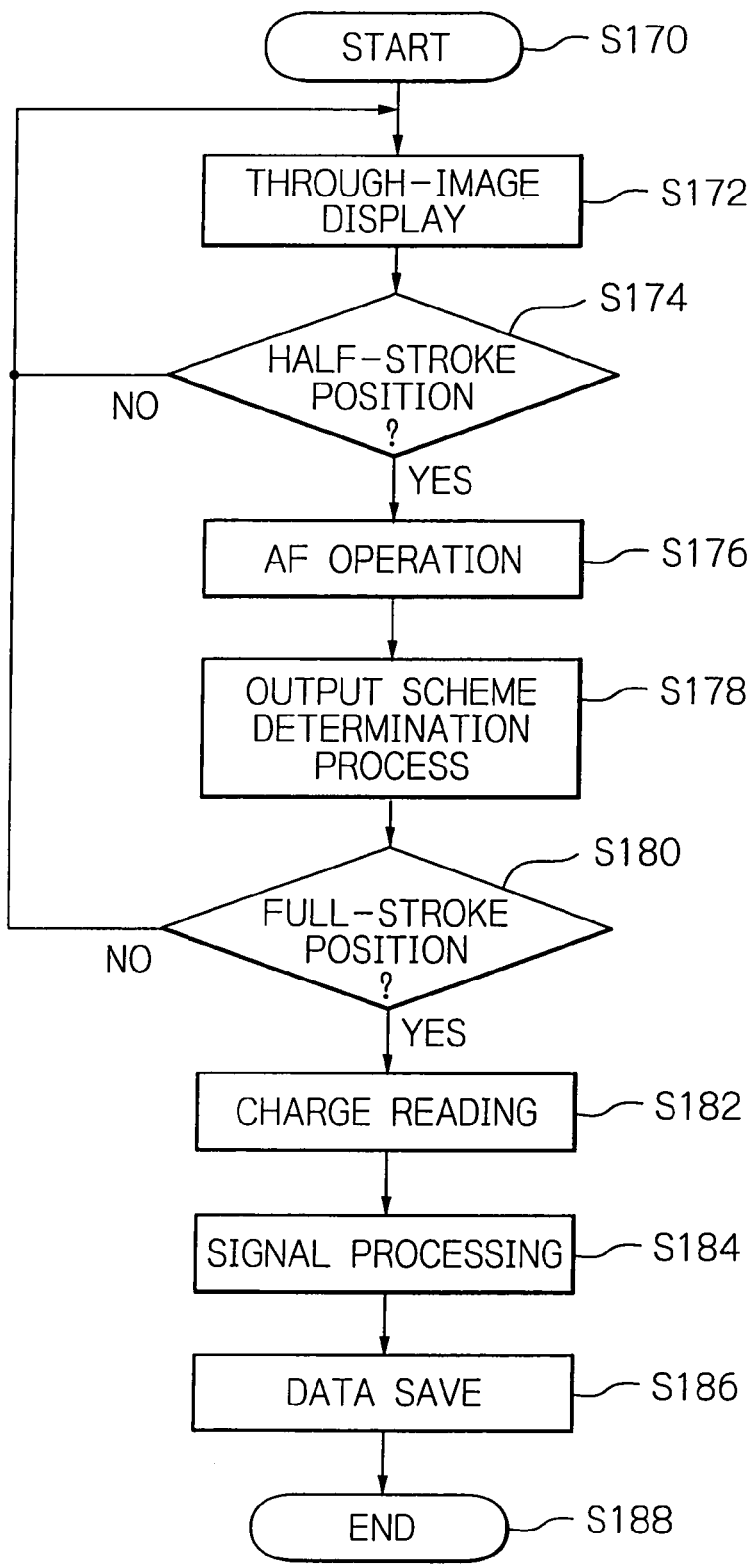
FIG. 3 is a flowchart useful for understanding an operation procedure of the solid-state image pickup apparatus of the embodiment shown in FIG. 1.

The operation of the solid-state image pickup apparatus 10 of the instant embodiment will be described below with reference to the flowchart shown in FIG. 3.

First, the power supply is turned on and the apparatus 10 becomes its standby state, step S170. The apparatus 10 then performs the through-image display processing S172.

At step S172, the image sensor 20 and signal processor 28 of the apparatus 10 produce a through image which the user may confirm a viewing field to be captured. The through images are displayed to the operator on a display unit, not-shown, as moving pictures. The operator, confirming the through image, depresses the shutter release button of the control panel 12 to shoot a desired field.

When the operator operates the shutter release button, the control passes to step S174, which determines whether the button of the apparatus 10 is depressed in its half stroke. If the button is half-depressed or more, then the control transfers to the AF operation S176, which starts the preliminary pickup. If not, then the control returns to the through-image display step S172.

The AF operation (S176) carries out the required AF control, depending on the field. In the instant embodiment, the AF operation (S176) particularly allows the AF information calculator 42 in the signal processor 28 to calculate the AF information. The control then passes to the output scheme establishing process S178.

The output scheme establishing process S178 first carries out the required AE control and AWB correction, depending on the field. In the present embodiment, the process S178 particularly allows the AE information calculator 44 and AWB information calculator 46 in the signal processor 28 to calculate the AE information and WB coefficient, respectively.

The output scheme establishing process S178 then allows the output scheme determiner 50 to define an output scheme depending on the shooting condition. For the normal sensitivity mode such as less than ISO 800, the process S178 defines the normal output scheme that has a low number of operative circuits such as one output and a normal drive frequency of about 30 to 40 MHz or 40 to 50 MHz.

For the high sensitivity mode such as ISO 800 or more, the process S178 defines the output scheme avoiding the color mixture that has a high number of operative circuits such as two outputs and a drive frequency for high sensitivity such as half the normal horizontal transfer rate.

The output scheme determiner 50 supplies the output scheme thus defined over the connecting line 124, bus 26, and connecting line 106 to the system controller 14.

The control then passes to step S180, which determines whether or not the shutter release button is fully depressed. If the button is fully depressed, then the actual pickup is started and the control passes to the charge reading step S182. If not, then the control returns to the through-image display step S172.

In the actual pickup, first, the control signal 104 that directs the imaging in the output scheme defined at step S178 is produced by the system controller 14. The timing signals 108 and 110 for specifying an output scheme are generated by the timing generator 16. The drive signal 114 that specifies an output scheme is generated by the driver 18.

In the charge reading step S182 in the actual pickup, the image sensor 20 reads out the signal charge representative of the optical image of an imaging field in response to the drive signal 114. Specifically, the signal charge in the photosensitive portion 80 is first read, in response to the read pulse, into the vertical transfer path 78. The signal charge on the vertical transfer path 78 is transferred, in response to the vertical drive signal 144, into the horizontal transfer path 72. The signal charge on the horizontal transfer path 72 is transferred, in response to the horizontal drive signal 146 that specifies the output scheme defined at step S178, to the plurality of output circuits 74 and 76.

When, for example, the output scheme is designated to the one-output scheme, the horizontal drive signal 146 directs the horizontal transfer in the left direction only or the horizontal transfer in the right direction only, thus transferring the signal charge at the normal drive frequency, i.e., at the normal transfer rate to one of the output circuits 74 and 76.

When the output scheme is the two-output scheme, the horizontal drive signal 146 directs the horizontal transfer in both directions, thus transferring the signal charge from the left and right areas to the output circuits 74 and 76, respectively, at the drive frequency for high sensitivity, i.e., at low rate.

The reset pulse 148 may drive only one of the output circuits 74 and 76 when the output scheme is the one-output scheme. The reset pulse 148 may drive both of the output circuits 74 and 76 when the output scheme is the two-output scheme.

The output circuits 74 and 76 convert the transferred signal charge to the electrical signals 150 and 152, respectively. The circuits 74 and 76 then output the signals 150 and 152 to the preprocessor 22, respectively. The electrical signals 150 and 152 are provided in the preprocessor 22 with the analog signal processing to produce the resultant digital image signal 118, which will be stored in the memory 24.

The control then passes to step S184, where the digital image signal stored in the memory 24 is read out over the connecting line 120, bus 26, and connecting line 124 to the signal processor 28, where the digital image signal is provided with the required digital signal processing.

Then the control passes to step S186, where the data is saved. First, the digital image signal processed at the step S184 is supplied over the connecting line 124, bus 26, and connecting line 126 to the compressor and decompressor 30, where the digital image signal is compressed. The compressed image signal is then supplied over the connecting line 126, bus 26, and connecting line 128 to the recorder 32, where the compressed image signal is recorded in the record medium. The operation of the actual pickup of the instant embodiment is then ended.

Figure 4:
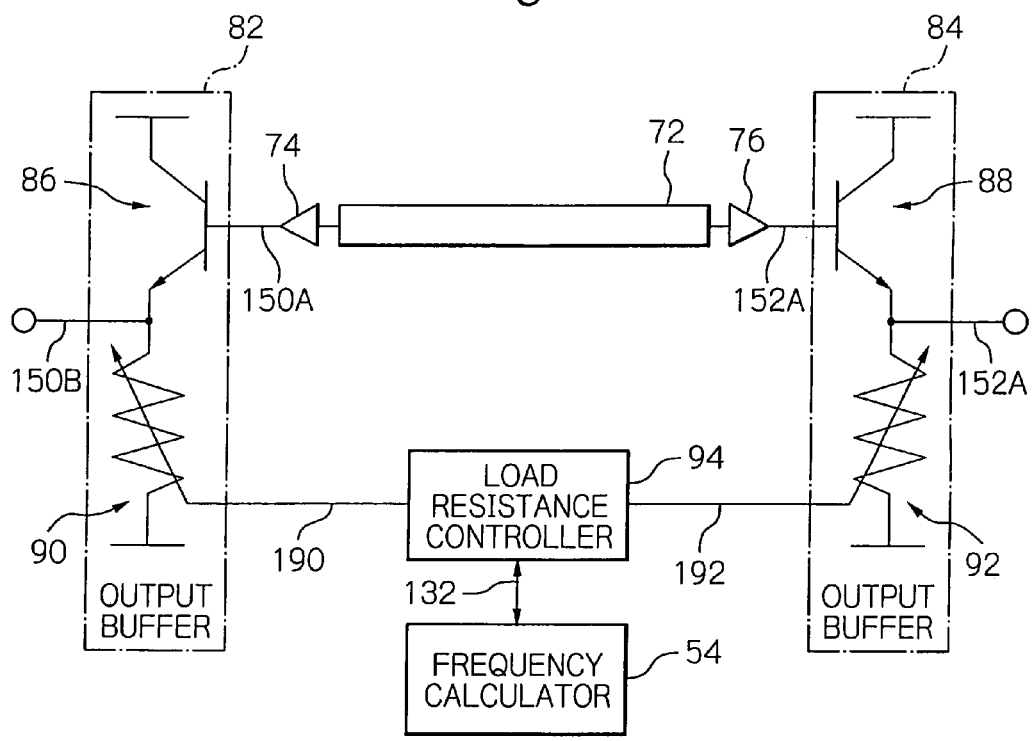
FIG. 4 is a schematic block diagram of output buffers connected to output circuits of the image sensor-shown in FIG. 2.

In the image sensor 20 of the apparatus 10, as shown in FIG. 4, the output circuits 74 and 76 may have their outputs 150A and 152A connected to output buffers 82 and 84, respectively. The output buffers 82 and 84 may adjust the load resistance, depending on the drive frequency for driving the horizontal transfer path 72, in order to reduce the power consumption.

The output buffers 82 and 84 may be a voltage buffer such as the emitter follower. The output buffers 82 and 84 include active devices 86 and 88 such as bipolar transistors and variable resistors 90 and 92, respectively. For example, the output buffer 82 receives the electrical signal 150A from the output circuit 74 on its active device 86, and then amplifies the output current of the electrical signal 150A with a predetermined gain value 194, and outputs the resultant electrical signal 150B.

Figure 5:
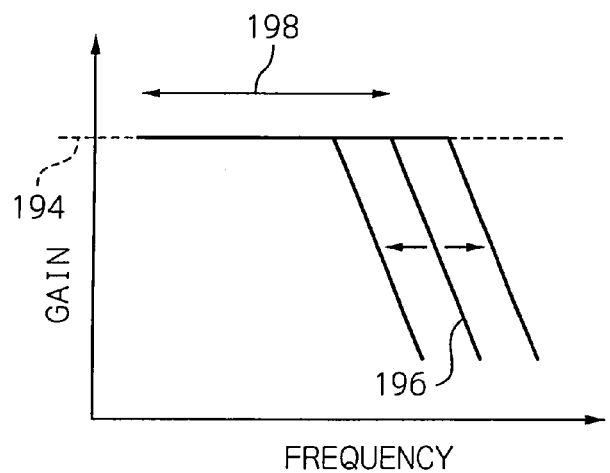
FIG. 5 is a graph plotting the frequency characteristic of the output buffer shown in FIG. 4.

The voltage buffer 82 has a frequency characteristic 196 as shown in FIG. 5. Specifically, when the output current falls within a predetermined frequency band 198, the voltage buffer 82 may use the predetermined gain value 194 to amplify the current. When the output current exceeds the predetermined frequency band 198, the voltage buffer 82 may use a reduced gain value to amplify the current. The frequency band 198 where the predetermined gain value 194 may be used changes inversely proportional to the resistance of the variable resistor 90. The voltage buffer 82 consumes the current also inversely proportional to the resistance.

The image sensor 20 includes, as shown in FIG. 4, a load resistance controller 94, which is adapted for producing control signals 190 and 192, depending on the horizontal drive frequency 132 supplied from the frequency calculator 54. The controller 94 then supplies the signals 190 and 192 to the variable resistors 90 and 92 in the output buffers 82 and 84, respectively, for controlling the variable resistance thereof.

The load resistance controller 94 of the instant embodiment may generate the control signal 190 such as to increase or decrease the resistance of the variable resistor 90 when, for example, the horizontal drive frequency 132 supplied from the frequency calculator 54 decreases or increases, respectively.

As described above, according to the output buffers 82 and 84 and the load resistance controller 94 of the instant embodiment, when the horizontal drive frequency 132 supplied from the frequency calculator 54 increases, regardless of the current consumption, the resistance of the variable resistors 90 and 92 may be decreased to extend the frequency band, whereas, when the horizontal drive frequency 132 decreases, the resistance of the variable resistors 90 and 92 may be increased to reduce the frequency band for less current consumption since each output buffer may have a margin in the frequency band of the output current.

Figure 6:
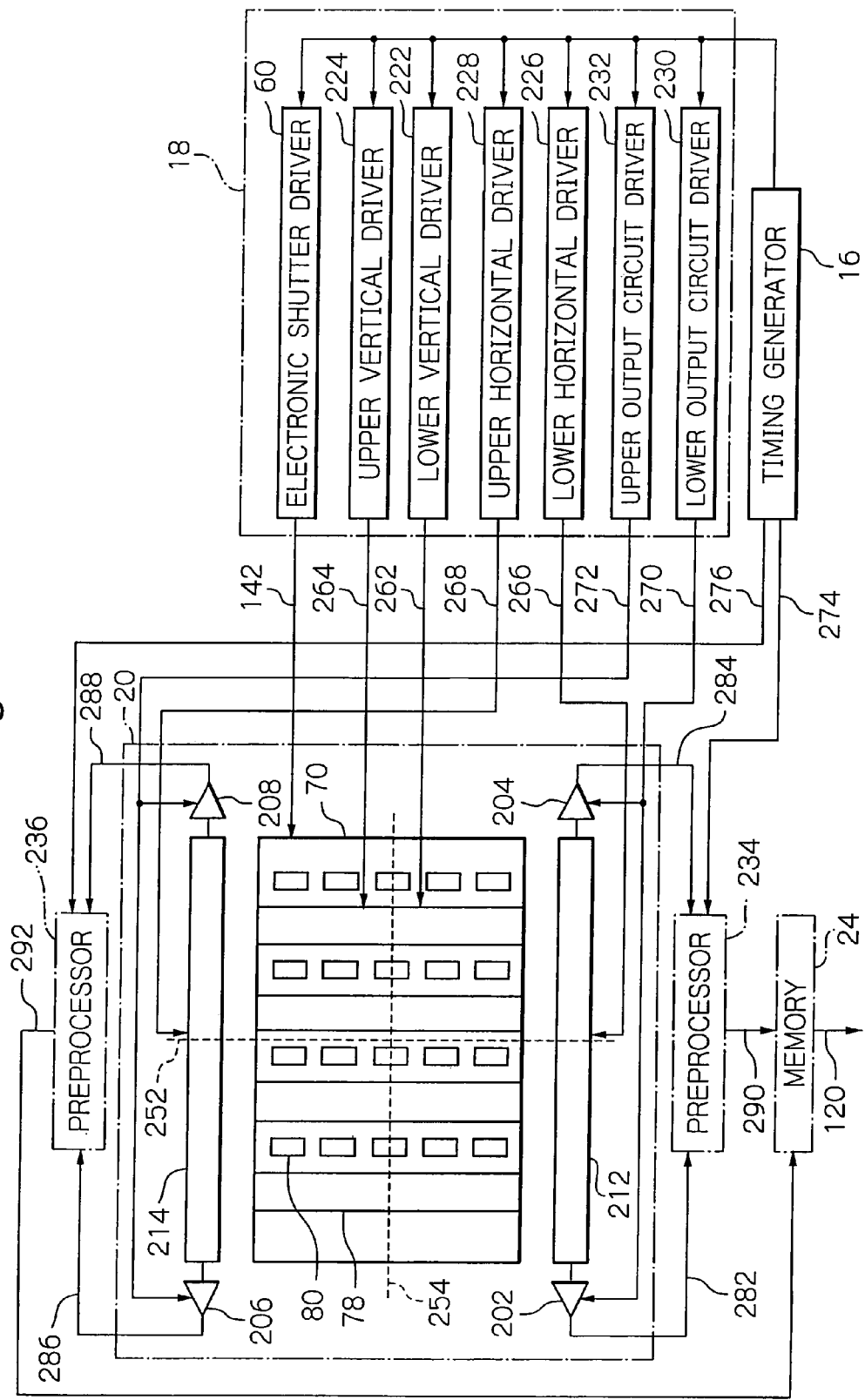
FIG. 6 is a schematic block diagram of an alternative embodiment of the image sensor and the driver in the solid-state image pickup apparatus shown in FIG. 1.

The image sensor 20 of the illustrative embodiment divides the pickup imaging area into a plurality of divided areas or sub-areas. The image sensor 20 also includes a plurality of output circuits that may output a plurality of analog electrical signals corresponding respectively to the divided areas. As an alternative embodiment, the image sensor 20 may include, for example as shown in FIG. 6, four output circuits 202, 204, 206, and 208 that may deal with the output signals supplied from up to four divided areas in one image.

With the alternative embodiment, the image sensor 20 includes horizontal transfer paths 212 and 214 below and above the imaging surface 70, respectively. The lower horizontal transfer path 212 has its respective ends connected to the output circuits 202 and 204. The upper horizontal transfer path 214 has its respective ends connected to the output circuits 206 and 208.

In the alternative embodiment, when one imaging area of pickup image is divided into four divided areas by center lines 252 and 254 in the vertical and lateral directions, respectively, the image sensor 20 transfers the signal charge from the four divided areas as follows. Specifically, among the signal charge supplied from the vertical transfer paths 78 in the imaging surface 70, the image sensor 20 transfers the signal charge from the lower left, lower right, upper left and upper right areas to the output circuits 202, 204, 206 and 208, respectively.

The driver 18 of the alternative embodiment generates the drive signal 114 depending on an output scheme specified by the timing signal 108. The driver 18 then supplies the signal 114 to the image sensor 20 to control the sensor 20 to output the analog electrical signal in the one-, two- or four-output scheme. The driver 18 includes, for example as shown in FIG. 6, a plurality of drivers that control the transfer of the signal charge in the image sensor 20 as follows. The driver 18 may include a lower vertical driver 222, a lower horizontal driver 226, and an lower output circuit driver 230, which control the transfer of the signal charge below the center line 254. The driver 18 may also include an upper vertical driver 224, an upper horizontal driver 228, and an upper output circuit driver 232, which control the transfer of the signal charge above the center line 254.

The lower vertical driver 222 generates a lower vertical drive signal 262 and supplies the signal 262 to a portion of each vertical transfer path 78 that is below the center line 254 in the imaging surface 70. Each vertical transfer path 78 is thus controlled to vertically transfer the signal charge in the downward direction i.e., to the lower horizontal transfer path 212.

The upper vertical driver 224 generates an upper vertical drive signal 264 and supplies the signal 264 to a portion of each vertical transfer path 78 that is above the center line 254 in the imaging surface 70. The vertical transfer of the signal charge in that portion is thus controlled. The upper vertical driver 224 controls each vertical transfer path 78 to transfer, when the output scheme is the four output mode, the signal charge in the upward direction, i.e., to the upper horizontal transfer path 214. The driver 224 also controls each vertical transfer path 78 to transfer, when the output scheme is the two-output or one-output scheme, the signal charge to the lower horizontal transfer path 212.

The lower and upper horizontal drivers 226 and 228 generate horizontal drive signals 266 and 268, respectively. The drivers 226 and 228 then supply the signals 266 and 288 to the lower and upper horizontal transfer paths 212 and 214, respectively, to control the paths. The lower and upper output circuit drivers 230 and 232 generate reset pulses 270 and 272, respectively. The drivers 230 and 232 then supply the pulses 270 and 272 to the output circuits 202 and 204 and the output circuits 206 and 208, respectively, to control those circuits.

In particular, the upper horizontal driver 228 and upper output circuit driver 232 may generate, only when the output scheme is the four output mode, the horizontal drive signal 268 and reset pulse 272 to operate the upper horizontal transfer path 214 and the output circuits 206 and 208, respectively.

In the instant embodiment, when the image sensor 20 operates in response to the drive signal 114 that specifies, for example, the two-output scheme, the lower horizontal transfer path 212 horizontally transfers the signal charge from the lower left area and lower right area in the imaging surface 70 to the output circuits 202 and 204, respectively. On the other hand, the upper horizontal transfer path 214 horizontally transfers the signal charge from the upper left area and upper right area in the imaging surface 70 to the output circuits 206 and 208, respectively. The output circuits 202, 204, 206, and 208 then output, based on the signal charge supplied from the lower left, lower right, upper left, and upper right areas, electrical signals 282, 284, 286, and 288 representing the lower left, lower right, upper left, and upper right areas, respectively.

The apparatus 10 may preferably include preprocessors 234 and 236 adapted to the properties of the lower and upper horizontal transfer paths 212 and 214, respectively. The preprocessors 234 and 236 are adapted to receive, from the output circuits 202 and 204 and the output circuits 206 and 208, the electrical signals 282 and 284 and the electrical signals 286 and 288, respectively. The preprocessors 234 and 236 are responsive to timing signals 274 and 276 supplied from the timing generator 16 to provide the electrical signals 282 and 284 and 286 and 288 with the analog signal processings in conformity with the properties of the horizontal transfer paths 212 and 214 to produce digital image signals 290 and 292, respectively. The signals 290 and 292 are then stored in the memory 24.

Figure 7:
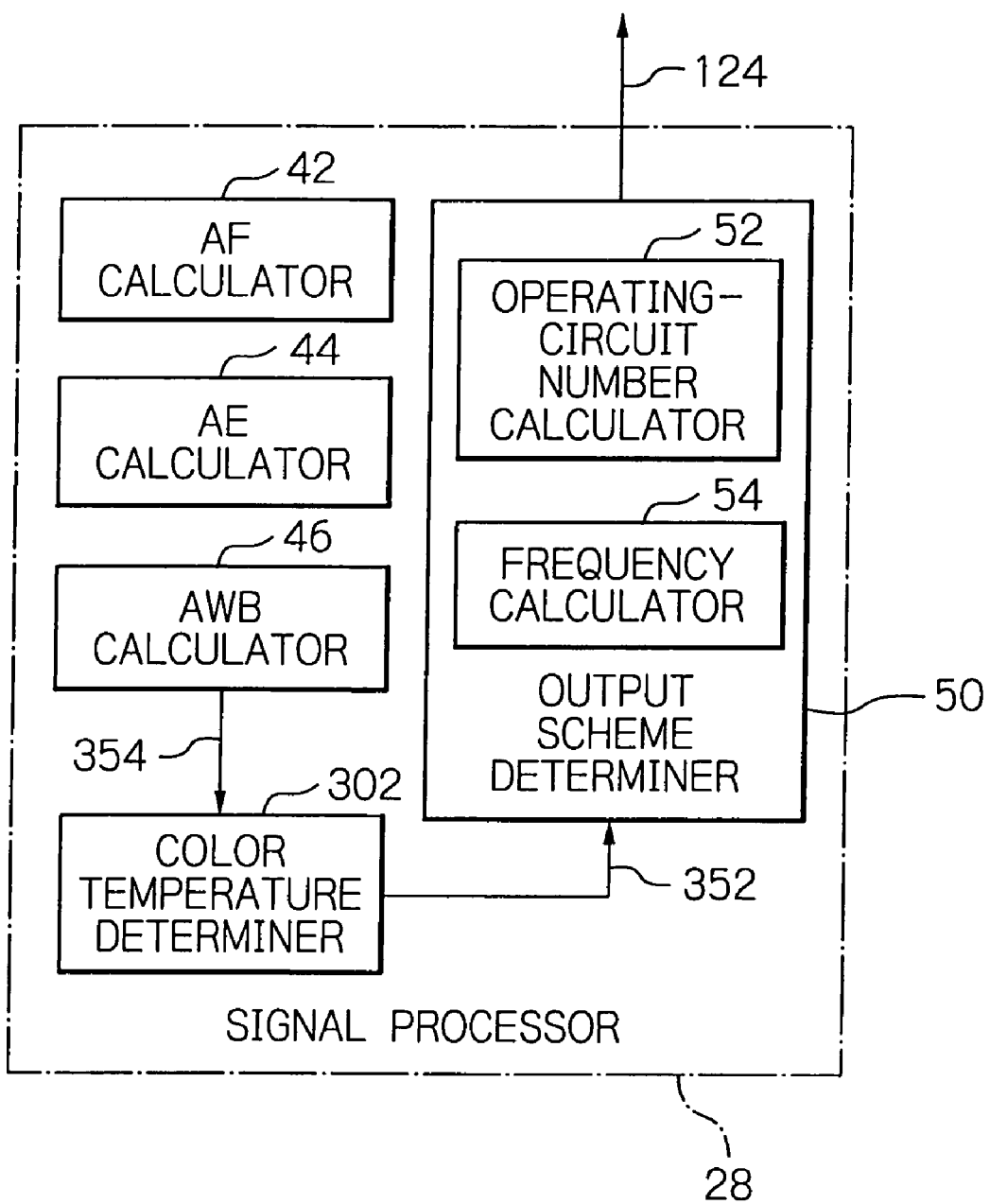
FIG. 7 is a schematic block diagram of a signal processor of the solid-state image pickup apparatus in the embodiment shown in FIG. 1.

In the instant alternative embodiment, the signal processor 28 may include, as shown in FIG. 7, a color temperature determiner 302 that determines the color temperature of the field to be captured. The output scheme determiner 50 in the signal processor 28 may then receive a decision result 352 from the determiner 302 and define an output scheme depending on the decision result 352.

The color temperature determiner 302 may operate, for example, during the preliminary pickup. The determiner 302 may read out from the memory 24 the digital image signal that is acquired in the preliminary pickup stage, i.e., the image signal that is not corrected in white balance, and use the image signal to detect and determine the color temperature.

The color temperature determiner 302 may be of the type of determining, for example, when an image signal represented by the three primary colors R, G and B has a high blue level that makes the entire image bluish, that the color temperature is high while determining, when the image signal has a high red level that makes the entire image reddish, that the color temperature is low. The color temperature determiner 302 may be adapted, for example, to determine an image signal representing an objective field captured under cloudy sunlight at a color temperature of 6000 (K) or higher as of a high color temperature, while determining an image signal representing an objective field under an incandescent lamp at a color temperature of 2500 (K) or higher as of a low color temperature, and an image signal corresponding to none of the high and low color temperatures but representing an objective field at a color temperature of, for example, 2500 (K) to 6000 (K) as of a color temperature within a predetermined usual range.

The signal processor 28 multiplies each color component signal in the image signal by the WB coefficient corresponding to that color to correct the color temperature of the image signal for the WB correction. The AWB information calculator 46 calculates the WB coefficient for each color. The color temperature determiner 302 may thus use the WB coefficient 354 calculated by the AWB information calculator 46 to determine the color temperature.

In the image signal represented by the three primary colors RGB, each color component signal has almost the same average value in general scenes. The AWB information calculator 46 may thus calculate the average value of each color component signal, and use the average value and a desired color temperature as a basis, e.g. by dividing the desired color temperature by the average value, to provide the WB coefficient 354 for each color. The color temperature determiner 302 may acquire the WB coefficient 354 for each color from the AWB information calculator 46 and compare the WB coefficient with a predetermined threshold to determine the color temperature.

The output scheme determiner 50 of the instant embodiment may select an output scheme avoiding the color mixture when the decision result 352 supplied from the color temperature determiner 302 indicates the high or low color temperature, while selecting the normal output scheme when the color temperature is within the usual range.

As described above, the solid-state image pickup apparatus 10 of the embodiments of the present invention may adaptively change the output scheme of the image sensor 20, depending on the temperature of each color in the image signal represented by the three primary colors R, G and B. The apparatus 10 may thus avoid a color mixture which would, otherwise, be significantly noticeable for a larger difference between the color component signals. This holds true when the apparatus 10 uses a type of image signal represented by the complementary color components, e.g., Cyan, Magenta, and Yellow as the three primary colors of light.

In operation, the output scheme establishing processing S178 shown in FIG. 3 of the solid-state image pickup apparatus 10 of the instant embodiment will be described below with reference to the flowchart shown in FIG. 8.

In the output scheme establishing processing S178, the apparatus 10 carries out preliminary photometry S372 to meter the brightness of incident light from the field. From a measurement of brightness, the AE information calculator 44 in the signal processor 28 detects the AE information such as an exposure value for use in the AE control.

The signal processor 28 allows the AWB information calculator 46 to detect a WB coefficient 354 for use in the AWB correction (step S374).

The signal processor 28 then allows the output scheme determiner 50 to define an output scheme depending on the shooting conditions. In the instant embodiment, the shooting conditions include the continuous-shooting mode, high sensitivity mode, and color temperature, which are determined to define or establish an output scheme.

It is first determined whether the shooting condition of the apparatus 10 is the continuous-shooting mode for continuously shooting an imaging field to be captured (step S376). If the continuous-shooting mode is active (Yes), then the control passes to step S382, which defines an output scheme suited for the continuous shooting. The output scheme to be selected is, for example, the scheme for the high speed shooting that has, for example, a high number of operative circuits such as four outputs and the normal drive frequency of about 30 to 40 MHz or 40 to 50 MHz.

If step S376 determines that the continuous-shooting mode is inactive (No), then the control passes to step S378, which determines whether or not the high sensitivity mode is selected.

If step S378 determines that the normal mode is selected, then the control passes to step S384, which defines an output scheme suited for the normal shooting. The output scheme to be selected is the normal scheme having, for example, a low number of operative circuits such as two outputs and the normal drive frequency.

If step S378 determines that the high sensitivity mode is selected, then the control passes to step S380, which determines where the color temperature is within the usual range.

Step 380 supplies the WB coefficient 354 detected in the AWB information calculator 46 to the color temperature determiner 302. The color temperature determiner 302 then compares the WB coefficient 354 with the predetermined threshold to determine a color temperature. The determiner 302 then supplies the decision result 352 to the output scheme determiner 50.

In step S380, if the decision result 352 supplied from the determiner 302 shows that the color temperature is within the usual range, then the control passes to step S384, where the determiner 50 defines or selects the normal output scheme.

If the decision result 352 shows that the color temperature is outside the usual range, i.e., in the high or low color temperature, then the control passes to step S386. Step S386 defines an output scheme avoiding the color mixture, which has a high number of operative circuits such as four outputs and the drive frequency for the high sensitivity, such as a drive frequency that reduces the normal horizontal transfer rate to half.

As described above, the output scheme determiner 50 of the instant embodiment defines, depending on the shooting conditions such as the continuous-shooting mode, high sensitivity mode, and color temperature, the output scheme in one of steps S382, S384, and S386. The thus defined output scheme is then supplied, over the connecting line 124, bus 26, and connecting line 106, to the system controller 14. Then control returns to step S180 shown in FIG. 3.

In the instant embodiment, the drive frequency that drives the vertical transfer paths, horizontal transfer path, and output circuits in the image sensor 20 is not set to an excessively high value, but set to up to about 40 to 50 MHz, for example. The drive frequency is thus not set to such a value which may excessively speed up the operation of those output circuits and the analog circuit in the preprocessor, reduce the transfer efficiency of those transfer paths, or degrade the image sensor performance.

When the image sensor 20 operates under the output scheme of four outputs and a drive frequency of 40 MHz, a produced image signal is read out at a rate corresponding to the speed at which the image sensor 20 operates under the output scheme of one output and a drive frequency of 160 MHz. Such a high speed reading is required only for picking up image in the continuous-shooting mode and the high-frame rate movie mode. In other shootings, therefore, the number of the operative output circuits and periphery circuit may be reduced to one or two outputs that may provide lower power consumption. This operation may sufficiently provide the same reading speed as in the operation under the output scheme of one output and a drive frequency of 40 to 80 MHz. For example, the reading speed may be reduced to ½ or ¼ with the drive frequency reduced to ½ or ¼.

In the solid-state image pickup apparatus 10 of an embodiment of the present invention, when the shooting mode is the movie mode, a predetermined pixel mixing scheme may be set, which can mix the signal charge in the horizontal transfer path 72 to thin out the pixels horizontally transferred in the operation of the image sensor 20. The output scheme determiner 50 may then define or select an output scheme depending on the pixel mixing scheme. When many pixels are mixed, e.g., a four-pixel mixing scheme is selected, in which a reduced amount of signal charge is transferred for each pixel, the output scheme of a lower number of operative circuits may be defined, whereas, when a few pixels are mixed, e.g., a two-pixel mixing scheme is selected, the output of a higher number of operative circuits may preferably be defined.

The entire disclosure of Japanese patent application No. 2006-069124 filed on Mar. 14, 2006, including the specification, claims, accompanying drawings and abstract of the disclosure is incorporated herein by reference in its entirety.

While the present invention has been described with reference to the particular illustrative embodiments, it is not to be restricted by the embodiments. It is to be appreciated that those skilled in the art can change or modify the embodiments without departing from the scope and spirit of the present invention.

What is claimed is:

1. A solid-state image pickup apparatus comprising:
   an image sensor comprising,
   a plurality of photosensitive portions for photoelectrically converting incident light to signal charge, said photosensitive portions being arranged in a row and a column direction to form an imaging surface corresponding to a plurality of pixels,
   a plurality of vertical transfer paths for vertically transferring the signal charge obtained in the plurality of pixels, on a one-row basis,
   a horizontal transfer path for horizontally transferring the signal charge transferred from said vertical transfer paths, and
   an output circuit for converting the signal charge transferred from said horizontal transfer path to an image electrical signal representing an image and outputting the image electrical signal; and
   a signal processor for receiving the image electrical signal from said image sensor and processing the image electrical signal,
   wherein said horizontal transfer path is provided in single or more, said output circuit being provided in plural, and each of said output circuits being provided at different one end of said horizontal transfer path, said signal processor comprising an output scheme determiner for defining, depending on a shooting condition, an output scheme associated with a number of operative ones of said plurality of output circuits and a drive frequency of said horizontal transfer path, said image sensor controlling, depending on the drive frequency, a horizontal transfer rate of the signal charge in said horizontal transfer path, and controlling, depending on the number of operative circuits, said plurality of vertical transfer paths, said horizontal transfer path, and said plurality of output circuits, in such a manner as to operate one or ones of said plurality of output circuits corresponding to the number of operative circuits, drive said plurality of vertical transfer paths and said horizontal transfer path to transfer the signal charge only to said operating output circuit or circuits, and allow said operating output circuit or circuits to produce and output the image electrical signal of a same number as the number of operative circuits, further wherein said output scheme determiner selects either one of a first output scheme and a second output scheme, the first output scheme having a first number of operative circuits and a first drive frequency at which said image sensor carries out a normal shooting operation, and the second output scheme having a second number of operative circuits higher than the first number of operative circuits and a second drive frequency lower than the first drive frequency, furthermore wherein one of a plurality of optical-sensitivity modes each associated with a respective International Standards Organization (ISO) sensitivity is set, and said apparatus carries out shooting in the one sensitivity mode set, and said output scheme determiner defines the output scheme depending on the one sensitivity set as the shooting condition.

2. The apparatus in accordance with claim 1, wherein said output scheme determiner selects one of the first output scheme, the second output scheme, and a third output scheme, the third output scheme having the second number of operative circuits and the first drive frequency.

3. The apparatus in accordance with claim 1, wherein said horizontal transfer path is provided in single, and said output circuits are provided two, each of said output circuits being provided at either end of said single horizontal transfer path, said output scheme determiner selecting either one of the first output scheme having the first number of operative circuits corresponding to one output and the second output scheme having the second number of operative circuits corresponding to two outputs, said image sensor rendering operative either one of said two output circuits when said image sensor operates in response to the first number of operative circuits, allowing said plurality of vertical transfer paths to vertically transfer all of the signal charge to said single horizontal transfer path, said single horizontal transfer path horizontally transferring all of the signal charge to said one operating output circuit, and said one operating output circuit producing and outputting the image electrical signal representing one picked-up image, said image sensor dividing, when said image sensor operates in response to the second number of operative circuits, the imaging surface into two divided areas on left and right sides in a direction of the row, rendering both of said two output circuits operative, allowing said plurality of vertical transfer paths to vertically transfer all of the signal charge to said single horizontal transfer path, said single horizontal transfer path to horizontally transfer the signal charge from one of the divided areas to said output circuit at one end of said horizontal transfer path, and to horizontally transfer the signal charge from another of the divided areas to the output circuit at the other end, and said two output circuits to produce and output a corresponding plurality of image electrical signals representing the two divided areas, respectively.

4. The apparatus in accordance with claim 1, wherein said horizontal transfer path is provided two, and said output circuits are provided four, each of said output circuits being provided at either end of said two horizontal transfer paths, said output scheme determiner selecting one of said first output scheme having the first number of operative circuits corresponding to two outputs and the second output scheme having the second number of operative circuits corresponding to four outputs, said image sensor dividing, when said image sensor operates in response to the first number of operative circuits, the imaging surface into two divided areas on left and right sides in a direction of the row, rendering one of said two horizontal transfer paths operative, rendering two of said output circuits provided to said one horizontal transfer path operative, allowing said plurality of vertical transfer paths to vertically transfer all of the signal charge to said horizontal transfer path, allowing said horizontal transfer path to horizontally transfer the signal charge transferred from one of the divided areas to one of said output circuits which is provided at one end of said horizontal transfer path, and to horizontally transfer the signal charge from the other of the divided areas to the other of said output circuits which is provided at the other end, and allowing said two output circuits to produce and output a plurality of image electrical signals corresponding to the two divided areas, respectively, said image sensor dividing, when said image sensor operates in response to the second number of operative circuits, the imaging surface into four divided areas on upper and lower sides in a direction of the column and left and right sides in a direction of the row, rendering all of said two horizontal transfer paths operative, and all of said four output circuits operative, allowing said plurality of vertical transfer paths to vertically transfer the signal charge from two of the divided areas which are on a side of one of said horizontal transfer paths to said one horizontal transfer path, and to vertically transfer the signal charge from the other two of the divided areas which are on a side of the other of said horizontal transfer paths to said other horizontal transfer path, allowing each of said two horizontal transfer paths to horizontally transfer the signal charge from one of the two divided areas to said one output circuit at the one end of said horizontal transfer path, and to horizontally transfer the signal charge from the other divided area to said output circuit at the other end, and allowing said four output circuits to produce and output a plurality of image electrical signals corresponding to the four divided areas of the image, respectively.

5. The apparatus in accordance with claim 1, wherein said output scheme determiner selects and defines the second output scheme when the one sensitivity set is high sensitivity, and otherwise selects and defines the first output scheme.

6. The apparatus in accordance with claim 1, wherein
a pixel mixing scheme is set,
said image sensor mixing, depending on the pixel mixing scheme set, the signal charge in said horizontal transfer path to thin out pixels horizontally transferred during the shooting,
said output scheme determiner defining the output scheme depending on the pixel mixing scheme as the shooting condition.

7. The apparatus in accordance with claim 6, wherein said output scheme determiner selects the first output scheme when the pixel mixing scheme is a four-pixel mixing scheme, and selects the second output scheme when the pixel mixing scheme is a two-pixel mixing scheme.

8. The apparatus in accordance with claim 1, wherein
said plurality of output circuits output the image electrical signal via an output buffer,
said output buffer comprising a variable resistor, and amplifying a current of the image electrical signal in a frequency band corresponding to a resistance of said variable resistor,
said apparatus further comprising a load resistance controller for controlling the resistance, depending on the drive frequency.

9. A solid-state image pickup apparatus comprising:
an image sensor comprising,
plurality of photosensitive portions for photoelectrically converting incident light to signal charge, said photosensitive portions being arranged in a row and a column direction to form an imaging surface corresponding to a plurality of pixels,
a plurality of vertical transfer paths for vertically transferring the signal charge obtained in the plurality of pixels, on a one-row basis,
a horizontal transfer path for horizontally transferring the signal charge transferred from said vertical transfer paths, and
an output circuit for converting the signal charge transferred from said horizontal transfer path to an image electrical signal representing an image and outputting the image electrical signal; and
a signal processor for receiving the image electrical signal from said image sensor and processing the image electrical signal,
wherein said horizontal transfer path is provided in single or more,
said output circuit being provided in plural, and each of said output circuits being provided at different one end of said horizontal transfer path,
said signal processor comprising an output scheme determiner for defining, depending on a shooting condition, an output scheme associated with a number of operative ones of said plurality of output circuits and a drive frequency of said horizontal transfer path,
said image sensor controlling, depending on the drive frequency, a horizontal transfer rate of the signal charge in said horizontal transfer path, and controlling, depending on the number of operative circuits, said plurality of vertical transfer paths, said horizontal transfer path, and said plurality of output circuits, in such a manner as to operate one or ones of said plurality of output circuits corresponding to the number of operative circuits, drive said plurality of vertical transfer paths and said horizontal transfer path to transfer the signal charge only to said operating output circuit or circuits, and allow said operating output circuit or circuits to produce and output the image electrical signal of a same number as the number of operative circuits,
further wherein said output scheme determiner selects either one of a first output scheme, a second output scheme, and a third output scheme, the first output scheme having a first number of operative circuits and a first drive frequency at which said image sensor carries out a normal shooting operation, and the second output scheme having a second number of operative circuits higher than the first number of operative circuits and a second drive frequency lower than the first drive frequency and the third output scheme having the second number of operative circuits and the first drive frequency,
furthermore wherein said horizontal transfer path is provided two, and said output circuits are provided four, each of said output circuits being provided at either end of said two horizontal transfer paths,
said output scheme determiner selecting one of said first output scheme having the first number of operative circuits corresponding to two outputs and the second output scheme having the second number of operative circuits corresponding to four outputs,
said image sensor dividing, when said image sensor operates in response to the first number of operative circuits, the imaging surface into two divided areas on left and right sides in a direction of the row, rendering one of said two horizontal transfer paths operative, rendering two of said output circuits provided to said one horizontal transfer path operative, allowing said plurality of vertical transfer paths to vertically transfer all of the signal charge to said horizontal transfer path, allowing said horizontal transfer path to horizontally transfer the signal charge transferred from one of the divided areas to one of said output circuits which is provided at one end of said horizontal transfer path, and to horizontally transfer the signal charge from the other of the divided areas to the other of said output circuits which is provided at the other end, and allowing said two output circuits to produce and output a plurality of image electrical signals corresponding to the two divided areas, respectively,
said image sensor dividing, when said image sensor operates in response to the second number of operative circuits, the imaging surface into four divided areas on upper and lower sides in a direction of the column and left and right sides in a direction of the row, rendering all of said two horizontal transfer paths operative, and all of said four output circuits operative, allowing said plurality of vertical transfer paths to vertically transfer the signal charge from two of the divided areas which are on a side of one of said horizontal transfer paths to said one horizontal transfer path, and to vertically transfer the signal charge from the other two of the divided areas which are on a side of the other of said horizontal transfer paths to said other horizontal transfer path, allowing each of said two horizontal transfer paths to horizontally transfer the signal charge from one of the two divided areas to said one output circuit at the one end of said horizontal transfer path, and to horizontally transfer the signal charge from the other divided area to said output circuit at the other end, and allowing said four output circuits to produce and output a plurality of image electrical signals corresponding to the four divided areas of the image, respectively, moreover wherein one of a plurality of shooting modes including at least a still image mode, a continuous-shooting mode, and a movie mode is set, and said apparatus carries out shooting in the one shooting mode set, said output scheme determiner defining the output scheme depending on the one shooting mode as the shooting condition, and further wherein said output scheme determiner selects the third output scheme when the shooting mode is the continuous-shooting mode.

10. The apparatus in accordance with claim 9, wherein a pixel mixing scheme is set, said image sensor mixing, depending on the pixel mixing scheme set, the signal charge in said horizontal transfer path to thin out pixels horizontally transferred during the shooting, said output scheme determiner defining the output scheme depending on the pixel mixing scheme as the shooting condition.

11. The apparatus in accordance with claim 9, wherein said plurality of output circuits output the image electrical signal via an output buffer, said output buffer comprising a variable resistor, and amplifying a current of the image electrical signal in a frequency band corresponding to a resistance of said variable resistor, said apparatus further comprising a load resistance controller for controlling the resistance, depending on the drive frequency.

12. A solid-state image pickup apparatus comprising:

an image sensor comprising, a plurality of photosensitive portions for photoelectrically converting incident light to signal charge, said photosensitive portions being arranged in a row and a column direction to form an imaging surface corresponding to a plurality of pixels, a plurality of vertical transfer paths for vertically transferring the signal charge obtained in the plurality of pixels, on a one-row basis, a horizontal transfer path for horizontally transferring the signal charge transferred from said vertical transfer paths, and an output circuit for converting the signal charge transferred from said horizontal transfer path to an image electrical signal representing an image and outputting the image electrical signal; and a signal processor for receiving the image electrical signal from said image sensor and processing the image electrical signal, wherein said horizontal transfer path is provided in single or more, said output circuit being provided in plural, and each of said output circuits being provided at different one end of said horizontal transfer path, said signal processor comprising an output scheme determiner for defining, depending on a shooting condition, an output scheme associated with a number of operative ones of said plurality of output circuits and a drive frequency of said horizontal transfer path, said image sensor controlling, depending on the drive frequency, a horizontal transfer rate of the signal charge in said horizontal transfer path, and controlling, depending on the number of operative circuits, said plurality of vertical transfer paths, said horizontal transfer path, and said plurality of output circuits, in such a manner as to operate one or ones of said plurality of output circuits corresponding to the number of operative circuits, drive said plurality of vertical transfer paths and said horizontal transfer path to transfer the signal charge only to said operating output circuit or circuits, and allow said operating output circuit or circuits to produce and output the image electrical signal of a same number as the number of operative circuits, further wherein said output scheme determiner selects either one of a first output scheme and a second output scheme, the first output scheme having a first number of operative circuits and a first drive frequency at which said image sensor carries out a normal shooting operation, and the second output scheme having a second number of operative circuits higher than the first number of operative circuits and a second drive frequency lower than the first drive frequency, furthermore wherein said signal processor comprises a color temperature determiner for determining a color temperature based on the image signal which is represented by three primary colors, red, green and blue, and picked up by said image sensor, said output scheme determiner defining the output scheme depending on a decision result supplied from said color temperature determiner as the shooting condition.

13. The apparatus in accordance with claim 12, wherein said output scheme determiner selects the second output scheme when said color temperature determiner provides the decision result of a high color temperature or a low color temperature, and otherwise selects the first output scheme.

14. The apparatus in accordance with claim 12, wherein said signal processor comprises a calculator for calculating, based on the image signal represented by the three primary colors, a coefficient for use in white balance correction for each color signal, said color temperature determiner comparing the coefficient with a predetermined threshold to determine the color temperature.

15. The apparatus in accordance with claim 12, wherein said output scheme determiner selects one of the first output scheme, the second output scheme, and a third output scheme, the third output scheme having the second number of operative circuits and the first drive frequency.

16. The apparatus in accordance with claim 12, wherein said horizontal transfer path is provided in single, and said output circuits are provided two, each of said output circuits being provided at either end of said single horizontal transfer path, said output scheme determiner selecting either one of the first output scheme having the first number of operative circuits corresponding to one output and the second output scheme having the second number of operative circuits corresponding to two outputs, said image sensor rendering operative either one of said two output circuits when said image sensor operates in response to the first number of operative circuits, allowing said plurality of vertical transfer paths to vertically transfer all of the signal charge to said single horizontal transfer path, said single horizontal transfer path horizontally transferring all of the signal charge to said one operating output circuit, and said one operating output circuit producing and outputting the image electrical signal representing one picked-up image, said image sensor dividing, when said image sensor operates in response to the second number of operative circuits, the imaging surface into two divided areas on left and right sides in a direction of the row, rendering both of said two output circuits operative, allowing said plurality of vertical transfer paths to vertically transfer all of the signal charge to said single horizontal transfer path, said single horizontal transfer path to horizontally transfer the signal charge from one of the divided areas to said output circuit at one end of said horizontal transfer path, and to horizontally transfer the signal charge from another of the divided areas to the output circuit at the other end, and said two output circuits to produce and output a corresponding plurality of image electrical signals representing the two divided areas, respectively.

17. The apparatus in accordance with claim 12, wherein said horizontal transfer path is provided two, and said output circuits are provided four, each of said output circuits being provided at either end of said two horizontal transfer paths, said output scheme determiner selecting one of said first output scheme having the first number of operative circuits corresponding to two outputs and the second output scheme having the second number of operative circuits corresponding to four outputs, said image sensor dividing, when said image sensor operates in response to the first number of operative circuits, the imaging surface into two divided areas on left and right sides in a direction of the row, rendering one of said two horizontal transfer paths operative, rendering two of said output circuits provided to said one horizontal transfer path operative, allowing said plurality of vertical transfer paths to vertically transfer all of the signal charge to said horizontal transfer path, allowing said horizontal transfer path to horizontally transfer the signal charge transferred from one of the divided areas to one of said output circuits which is provided at one end of said horizontal transfer path, and to horizontally transfer the signal charge from the other of the divided areas to the other of said output circuits which is provided at the other end, and allowing said two output circuits to produce and output a plurality of image electrical signals corresponding to the two divided areas, respectively, said image sensor dividing, when said image sensor operates in response to the second number of operative circuits, the imaging surface into four divided areas on upper and lower sides in a direction of the column and left and right sides in a direction of the row, rendering all of said two horizontal transfer paths operative, and all of said four output circuits operative, allowing said plurality of vertical transfer paths to vertically transfer the signal charge from two of the divided areas which are on a side of one of said horizontal transfer paths to said one horizontal transfer path, and to vertically transfer the signal charge from the other two of the divided areas which are on a side of the other of said horizontal transfer paths to said other horizontal transfer path, allowing each of said two horizontal transfer paths to horizontally transfer the signal charge from one of the two divided areas to said one output circuit at the one end of said horizontal transfer path, and to horizontally transfer the signal charge from the other divided area to said output circuit at the other end, and allowing said four output circuits to produce and output a plurality of image electrical signals corresponding to the four divided areas of the image, respectively.

18. The apparatus in accordance with claim 12, wherein a pixel mixing scheme is set, said image sensor mixing, depending on the pixel mixing scheme set, the signal charge in said horizontal transfer path to thin out pixels horizontally transferred during the shooting, said output scheme determiner defining the output scheme depending on the pixel mixing scheme as the shooting condition.

19. The apparatus in accordance with claim 12, wherein said plurality of output circuits output the image electrical signal via an output buffer, said output buffer comprising a variable resistor, and amplifying a current of the image electrical signal in a frequency band corresponding to a resistance of said variable resistor, said apparatus further comprising a load resistance controller for controlling the resistance, depending on the drive frequency.

* * * * *